FIP8212 UR 3,569,718

250/201

United States Patent

[11] 3,569,718

[72] Inventor Manfred Borner
Ulm, (Danube), Germany
[21] Appl. No. 649,593
[22] Filed June 28, 1967
[45] Patented Mar. 9, 1971
[73] Assignee Telefunken Patentverwertungsgesellschaft m. b. H.
Ulm, (Danube), Germany
[32] Priority July 1, 1966
[33] Germany
[31] T31500

[54] DEVICE FOR THE FINE ADJUSTMENT OF PHOTOMASKS WITH RESPECT TO SEMICONDUCTOR ELEMENTS

7 Claims, 3 Drawing Figs.

[52] U.S. Cl. 250/201, 29/579, 250/219, 250/237, 310/8.1, 310/26, 318/118
[51] Int. Cl. G01n 21/30
[50] Field of Search 29/578, 579 (Inquired); 118/(Inquired); 117/(Inquired); 318/118; 310/8.1, 26 (Inquired); 250/201, 219 (Rg), 237

[56] References Cited

UNITED STATES PATENTS

| | | | |
|---|---|---|---|
| 3,037,156 | 5/1962 | Koulikovitch | 318/118X |
| 3,233,749 | 2/1966 | Devol | 318/118X |
| 3,245,794 | 4/1966 | Conley | 29/578X |
| 3,356,848 | 12/1967 | Heyck | 310/81X |
| 3,377,489 | 4/1968 | Brisbane | 310/26X |

FOREIGN PATENTS

| | | | |
|---|---|---|---|
| 493,645 | 6/1953 | Canada | 310/26 |

OTHER REFERENCES

Steiner, " Two-sided Masking of Silicon Wafers," IBM Technical Disclosure Bulletin, Vol. 9 No. 10 Mar. 1967, p. 1385— 86 29—578

*Primary Examiner*—James W. Lawrence
*Assistant Examiner*—C. M. Leedom
*Attorney*—Spencer and Kaye

ABSTRACT: In the manufacture of semiconductor devices with the aid of photomasks, the correct position of the photomask with respect to the semiconductor body to be processed is adjusted by the use of rod-shaped electromechanical transducers which are connected to the photomask and which, when energized vary their length and so displace the photomask in relation to the semiconductor body.

Inventor:
Manfred Börner
BY Spencer & Kaye
Attorneys

Inventor:
Manfred Börner
BY Spencer & Kaye
Attorneys

DEVICE FOR THE FINE ADJUSTMENT OF PHOTOMASKS WITH RESPECT TO SEMICONDUCTOR ELEMENTS

BACKGROUND OF THE INVENTION

In the production of transistors, diodes and integrated switching circuits, methods are known which use masks for the selective exposure of certain parts of the semiconductor surfaces covered with light-sensitive lacquers. In the course of the manufacturing process for such electrical components it is important for the individual masks, which are necessary for the successive manufacturing steps, to be adjusted very accurately with respect to the structures which have been produced by the masks used in preceding steps. Hitherto, the adjustment was carried out by mechanical means, such as extending and rotating tables, the accuracy of which is not always sufficient. In a high-frequency transistor for the gcps range, for example, with width of the emitter amounts to only about 3$\mu$from which it can be seen what accuracy is required.

SUMMARY OF THE INVENTION

It is the object of the present invention to provide a new device by means of which the accuracy of the mask adjustment can be improved.

According to the invention, it is proposed that the device for the fine adjustment consists of energizable, rod-shaped, electromechanical transducers which are connected on the one hand to a carrier for the photo mask and on the other hand to the semiconductor element or a frame holding the semiconductor element.

DESCRIPTION OF THE PREFERRED EMBODIMENT

Figure 1:
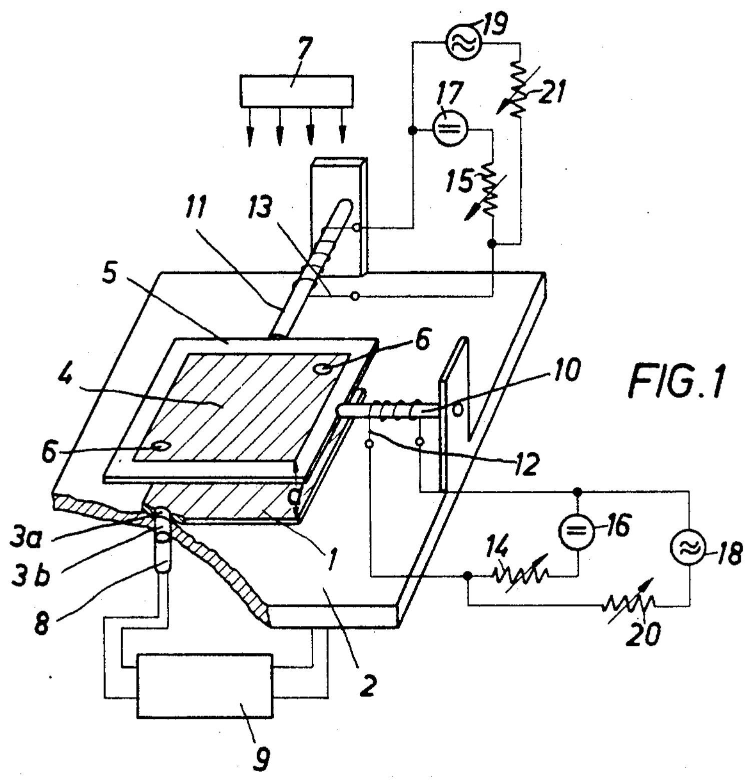
FIG. 1 is a diagrammatic illustration of a device according to the invention.

FIG. 1 shows diagrammatically an adjusting device according to the invention. A semiconductor element 1 is secured to a base plate 2 which has two bores *3b*, only one of which is illustrated in the drawing for the sake of clarity. The semiconductor element 1 is likewise provided with bores 3*a* which are in register with the bores *3b*. Although bores 3*a* and *3b* are provided in the example illustrated, nevertheless light permeable regions, for example thinner regions of material, may be provided instead. A photomask 4 which is secured to a mask carrier 5 is provided above the base plate 2 at a distance *d* which is generally very short. The photomask 4 has two bores 6. Above the photomask 4 is a light source 7. Below the bores *3b* in the base plate 2 and the bores 3*a* in the semiconductor element 1 are photodiodes 8 or the like, of which only one is visible in the drawing. It is the purpose of these photodiodes 8 to indicate by means of their photoelectric currents in an indicator device 9 the extent to which the bores 3*a* in the semiconductor element 1 and the bores 6 in the mask carrier 5 have been brought into register.

If infrared light is used as a radiation source 7, the bores 3*a* in the semiconductor element can likewise be dispensed with if this element is sufficiently thin for the infrared light to pass through to an adequate extent.

After a course preliminary adjustment has been effected, the mask carrier 5 is displaced very sensitively during the fine adjustment by means of electromechanical transducers which, in the example described, consist of magnetostrictive rods 10 and 11 provided with energizing windings 12 and 13 respectively. The magnetostrictive rods 10 and 11 which are rigidly connected, on the one hand, to the mask carrier 5 and, on the other hand, to the base plate 2 and hence to the semiconductor element, undergo a variation in length depending on the current flowing through the energizing winding and so permit a variation in position of the mask carrier 5 and hence of the mask 4, which variation can be controlled with great precision. The control of the variation in length of the magnetostrictive rods 10 and 11 is effected by varying the energizing current by means of resistors 14 and 15 which are connected in circuits of direct current sources 16 and 17 respectively. In the simplest case, the photoelectric currents of the two photodiodes 8 can be measured and successively adjusted to a maximum by adjusting the resistors 14 and 15. This adjustment can be improved by superimposing a low alternating current on the direct current controlled by the resistors 14 and 15, so as to superimpose an alternating motion of about $10^{-2}$on the steady motion of the mask carrier. This is effected in the example by means of alternating current sources 18 and 19 which are connected in parallel with the direct current sources 16 and 17 can can be regulated by means of resistors 20 and 21 respectively. Even the smallest amplitudes down to one A. can be measured with sensitive indicating instruments. The slight alternating movement of the mask carrier produces an alternating light in the photodiodes 8. If the resulting photoelectric current is rectified with a phase sensitive rectifier, then the zero position, that is to say the moment at which the bores in the base plate and mask carrier are brought into register, can be adjusted with an accuracy which is greater than the amplitude of the alternating movement of the mask carrier. For this purpose, a control amplifier is connected to the output of the phase rectifier and adjusts the direct current due to deflection in such a manner that the voltage at the phase rectifier becomes zero.

Figure 3:
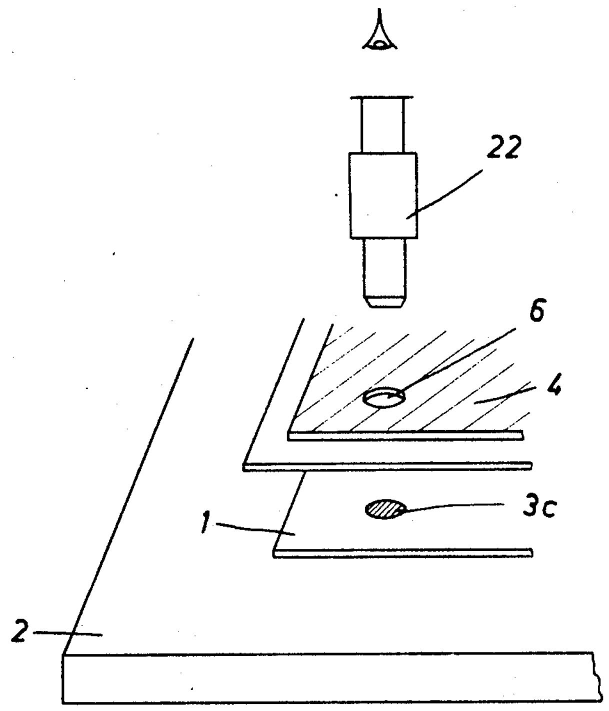
FIG. 3 shows a further example of an embodiment of the invention

If a light-reflecting mark 3*c*, as illustrated in FIG. 3, is used instead of a bore 3*a* (FIG. 1), then the adjustment can also be supervised by observation through an incident light microscope 22. The mask 4 is provided again with a bore 6. Naturally here, too, a photoelectric cell measurement may be carried out instead of using the human eye, which renders possible a subsequent automatic adjustment in a manner which is precisely the same as that described above.

Figure 2:
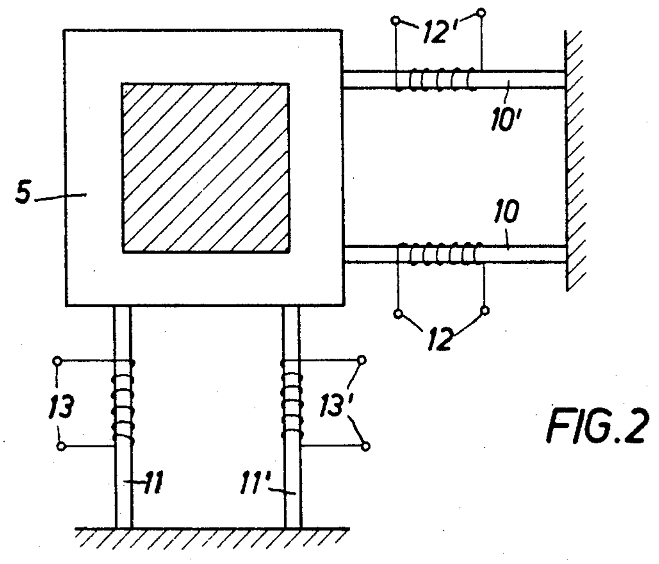
FIG. 2 shows a detail as a further example of an embodiment of the invention.

The adjusting device shown in FIG. 1 does not, in itself, permit a rotary movement of the mask carrier 5. FIG. 2 shows an adjusting device which is improved in this respect in comparison with FIG. 1 and which also renders possible a rotation of the mask carrier 5. For this purpose, two magnetostrictive rods 10 and 10' or 11 and 11' respectively are provided at each of two sides of the mask carrier 5 at right angles to one another, and each rod carries an energizing winding 12, 12', 13 and 13' respectively. If the energizing windings 12 and 12' and the energizing windings 13 and 13' are energized in-phase and to equal extents, a movement of the mask carrier 5 results such as can be achieved with the device shown in FIG. 1. On the other hand, if the energizing windings 12 and 13 are energized in-phase and the energizing windings 12' and 13' in phase-opposition, then a turning of the mask carrier 5 results. As a result of this additional turning, further possibilities for adjustment are obtained.

An automatic adjusting device as described above may, of course, also be used for the adjustment for three quantities (height, width, angular position). The potentiometers for the setting of the current or voltage can be controlled in a simple manner by means of servomotors which derive their exciting voltages from said control amplifiers. It is also possible, however, to supply the currents from the control amplifiers direct to the electromechanical transducers. In this case, the controlled conditions for height, width, and angular adjustment must be differentiated from one another which may be done in such a manner that the frequencies of the superimposed alternating voltages or alternating currents are different for each one of the three said adjusting directions in which the actual position has to be sensed and adjusted.

If the rod-shaped electromechanical transducers are not sufficient to hold the mask carrier, the mask carrier may be held by means of additional bearing rods which are mounted perpendicular to the plane of the mask carrier and which then are subjected to bending stress. Since the unidirectional movement of the mask carrier only amounts to a few $\mu$, the length of the bearing rods, which may be very thin, need only amount to a few cm. Any variation in height caused by the bending of the bearing rods due to a lateral movement of the mask carrier then remains within acceptable limits.

The additional bearing rods may also be made in the form of electromechanical transducers whereby an additional adjustment for the photomasks in height may be carried out.

It will be appreciated that it lies within the scope of the invention to use electrostrictive and piezoelectric rods instead of magnetostrictive rods. If electrostrictive rods are used, the advantages is obtained of achieving amplitudes of movement greater by about the factor 10 with the same dimensions.

The adjusting device described may, of course, also be used for other technical processes, for example for the projection technique.

I claim:

1. A device for the fine adjustment of a photomask with respect to an element to be processed by radiation, which device comprises energizable rod-shaped electromechanical transducers which are in connection, on the one hand, with a carrier for the photomask and, on the other hand, with the said element to be processed, and wherein the electromechanical transducers are connected to separate controlled direct current sources, and an alternating current source is connected in parallel with each of the direct current sources.

2. A device as claimed in claim 1 wherein the said element to be processed is a semiconductor element.

3. A device as claimed in claim 1, wherein at least one of the electromechanical transducers is magnetostrictive transducer.

4. A device as claimed in claim 1 wherein at least one of the electromechanical transducers is an electrostrictive transducer.

5. A device as claimed in claim 1 wherein at least one of the electromechanical transducers is a piezoelectric transducer.

6. A device as claimed in claim 1, wherein the photomask has a light-permeable region and a mark is provided on the subjacent semiconductor element, the reflection characteristics of which mark differ from those of the rest of the surface so that the relative position of photomask and semiconductor element can be determined by means of an incident-light optical device containing a photoelectric receiver.

7. A circuit arrangement for a device as claimed in claim 6, wherein the photoelectric receiver is connected, through phase-sensitive rectifiers, to control amplifiers for such an adjustment of the energizing voltages for the electromechanical transducers that the photomask and semiconductor element are brought into the desired position in relation to one another.